US009145242B2

(12) United States Patent
Wang

(10) Patent No.: US 9,145,242 B2
(45) Date of Patent: Sep. 29, 2015

(54) AIRTIGHT STORAGE CONTAINER

(71) Applicant: Jui-Te Wang, Taichung (TW)

(72) Inventor: Jui-Te Wang, Taichung (TW)

(73) Assignees: Jui-Te Wang, Taichung (TW); Jordan S. Tarlow, Taichung (TW)

( * ) Notice: Subject to any disclaimer, the term of this patent is extended or adjusted under 35 U.S.C. 154(b) by 0 days.

(21) Appl. No.: 14/608,196

(22) Filed: Jan. 29, 2015

(65) Prior Publication Data

US 2015/0136770 A1    May 21, 2015

Related U.S. Application Data

(63) Continuation-in-part of application No. 13/934,195, filed on Jul. 2, 2013.

(51) Int. Cl.
*B65D 51/16* (2006.01)
*A47J 47/02* (2006.01)
*F16K 17/19* (2006.01)

(52) U.S. Cl.
CPC ............. *B65D 51/1644* (2013.01); *A47J 47/02* (2013.01); *F16K 17/19* (2013.01)

(58) Field of Classification Search
CPC ............... B65D 81/20; B65D 81/2015; B65D 81/2038; B65D 51/165; B65D 51/1683; B65D 51/1688; B65B 31/047; A47J 47/10; F16K 15/14; F16K 15/148; F16K 17/19
USPC ............. 220/203.01–203.02, 203.07, 203.27, 220/203.29, 212, 231, 367.1; 215/230, 260, 215/262, 270–271, 307, 311, 315; 141/65, 141/83, 95; 206/524.8
See application file for complete search history.

(56) References Cited

U.S. PATENT DOCUMENTS

| | | | |
|---|---|---|---|
| 1,621,132 A | 3/1927 | Reinbold | |
| 3,943,987 A * | 3/1976 | Rossi | 206/524.8 |
| 4,051,971 A * | 10/1977 | Saleri et al. | 215/260 |
| 4,278,114 A * | 7/1981 | Ruberg | 141/65 |
| 5,397,024 A * | 3/1995 | Wu et al. | 220/231 |
| 5,406,992 A * | 4/1995 | Miramon | 141/65 |
| 5,469,979 A * | 11/1995 | Chiou | 215/228 |
| 5,564,480 A * | 10/1996 | Chen | 141/65 |
| 5,611,376 A * | 3/1997 | Chuang | 141/65 |
| 5,697,510 A * | 12/1997 | Wang et al. | 215/262 |
| 6,644,489 B2 * | 11/2003 | Chang | 220/203.01 |
| 6,877,629 B2 * | 4/2005 | Meyer | 220/212 |
| 6,994,227 B2 * | 2/2006 | Kwon | 220/212 |
| 8,069,987 B2 * | 12/2011 | Choy et al. | 206/524.8 |
| 2006/0138068 A1 * | 6/2006 | Tsai et al. | 215/228 |
| 2006/0151354 A1 * | 7/2006 | Dombroski et al. | 206/524.8 |
| 2008/0078466 A1 * | 4/2008 | Wang et al. | 141/65 |
| 2009/0283527 A1 * | 11/2009 | Wu | 220/367.1 |
| 2010/0200588 A1 * | 8/2010 | Bergman et al. | 220/203.01 |
| 2013/0146500 A1 * | 6/2013 | Kim | 206/524.8 |

* cited by examiner

*Primary Examiner* — Bryon Gehman
*Assistant Examiner* — Brisjesh V. Patel

(57) ABSTRACT

A container includes a container body, a lid member, a first seal valve and a second non-return valve. The lid member is superimposable on the container body to form a storage chamber in the container, and defines therein a first opening and a second opening. The first seal valve is disposed on the lid member, normally seals the first opening of the lid member, and is operable to unseal the first opening of the lid member. The second, non-return valve is disposed in the second opening of the lid member to permit air to actively flow out of the storage chamber of the container body upon reaching a predetermined degree of pressure, and to prevent environmental air from being drawn into the storage chamber.

5 Claims, 7 Drawing Sheets

AIRTIGHT STORAGE CONTAINER

CROSS-REFERENCE TO RELATED APPLICATION

This is a continuation-in-part of co-pending application Ser. No. 13/934,195, filed on Jul. 2, 2013.

BACKGROUND OF THE INVENTION

1. Field of the Invention

The present invention relates to a container, and more particularly to an airtight storage container.

2. Description of the Related Art

Coffee beans are usually vacuum packed in tins or canisters for reducing the ability of the coffee beans to interact with oxygen and atmospheric moisture and thereby maintaining the beans fresh during an extended period of time prior to the use thereof. Once a consumer opens the vacuum packed container, the vacuum is lost. To further maintain fresh, the consumer may need to get a coffee canister for storing the coffee beans.

One type of canisters is shown in U.S. Pat. No. 1,621,132, in which there is shown a fruit jar cover for creating a partial vacuum in the jar by means of a hand pump and sealing an opening through which the air is withdrawn by a rubber cap. However, this type of canister is not suitable for storage of the coffee beans. It should be noted that the coffee beans themselves may ferment with time by nature and produce gas within the jar, causing an increase of pressure in the jar. Once the interior pressure is high enough to be greater than the outer atmospheric pressure, the rubber cap may no longer serve to seal the opening in the cover, and the cover may even further be lifted by the interior pressure, leading the coffee beans to interact with oxygen and atmospheric moisture undesirably.

SUMMARY OF THE INVENTION

It is an object of the present invention to provide a container, in which hermetic sealing can be simply and economically produced whenever desired.

It is another object of the invention to provide a container of the above design, which is of a simple structure and low cost.

It is yet another object of the invention to provide a container for storage of coffee beans without the disadvantages as described in the related prior art.

Briefly described, the container of this invention includes a container body, a lid member, a first seal valve and a second non-return valve. The lid member is superimposable on the container body to form a storage chamber in the container, and defines therein a first opening and a second opening. The first seal valve is disposed on the lid member, normally seals the first opening of the lid member, and is operable to unseal the first opening of the lid member. The second, non-return valve is disposed in the second opening of the lid member to permit air to actively flow out of the storage chamber of the container body upon reaching a predetermined degree of pressure, and to prevent environmental air from being drawn into the storage chamber.

Preferred embodiments of the invention may have the following additional characteristics, either alone or in combination:

The first seal valve includes a button disposed outside the lid member, a shutter disposed inside the lid member, and a spring interposed between the button and an outer face of a partition wall of the lid member. The shutter extends through the first aperture of the lid member to engage with the button. The spring normally urges the button outwardly and away from the partition wall thereby to hold the shutter in tight sealing contact with an inner face of the partition wall of the lid member around the first aperture.

Moreover, the second non-return valve is directed to a duckbill check valve with one end having a seam line to flex open to permit air to pass through and to close to prevent backflow.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
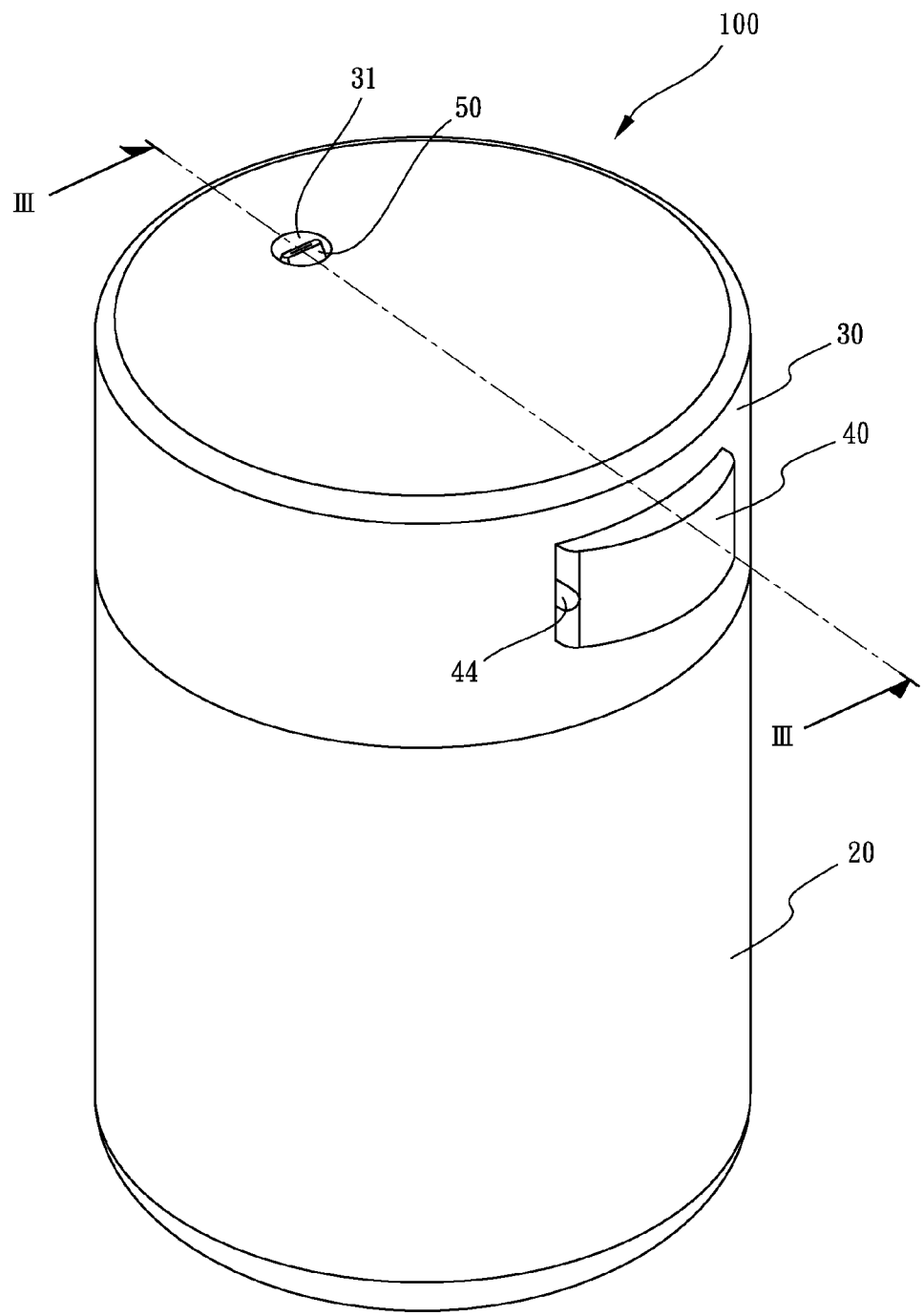
FIG. 1 is a perspective view of a container in accordance with the preferred embodiment of the present invention.
Figure 2:
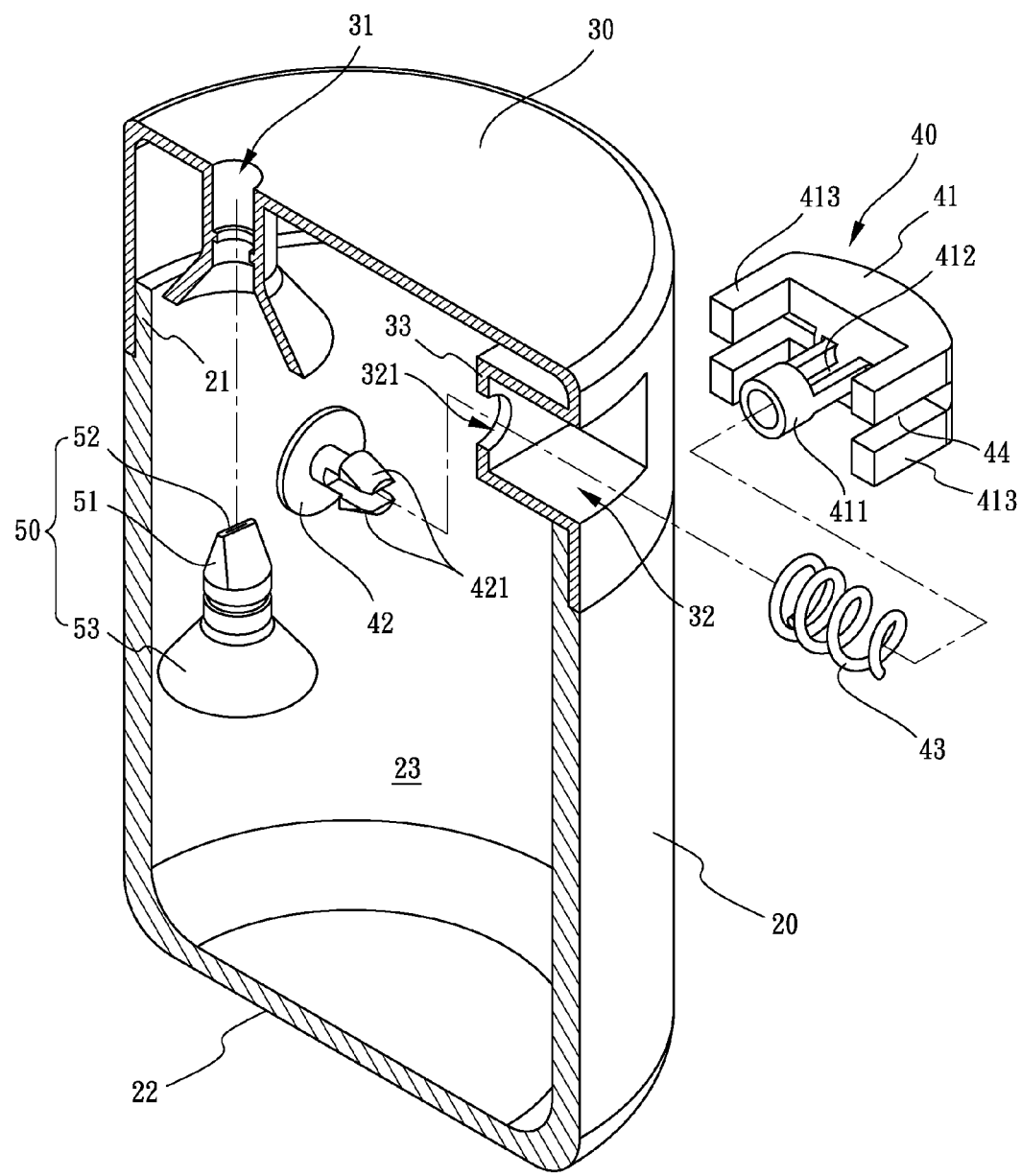
FIG. 2 is an exploded perspective view of the container in FIG. 1, partly broken away to show the detail inside.

Referring now to the drawings for a more detailed description of the present invention and more particularly to FIGS. 1 and 2, a novel airtight storage container made according thereto is generally indicated by the reference numeral 100. The container 100 as shown generally includes a container body 20, a lid member 30, a first, seal valve 40 and a second, non-return valve 50.

As best seen in FIG. 2, the container body 20 has a generally cylindrical shape with an open top end 21 and a closed bottom end 22. The lid member 30 is superimposable on the open top end 21 of the container body 20 to form a storage chamber 23 in the container 100. A receptacle 32 is provided in a side of the lid member 30 to receive the first seal valve 40. The lid member 30 further defines a first opening 321 in a partition wall 33 thereof that separates the storage chamber 23 and the receptacle 32, and a second opening 31 in a top wall thereof. That is, the first opening 321 in the partition wall 33 communicates the storage chamber 23 and the receptacle 32 of the lid member 30.

Figure 3:
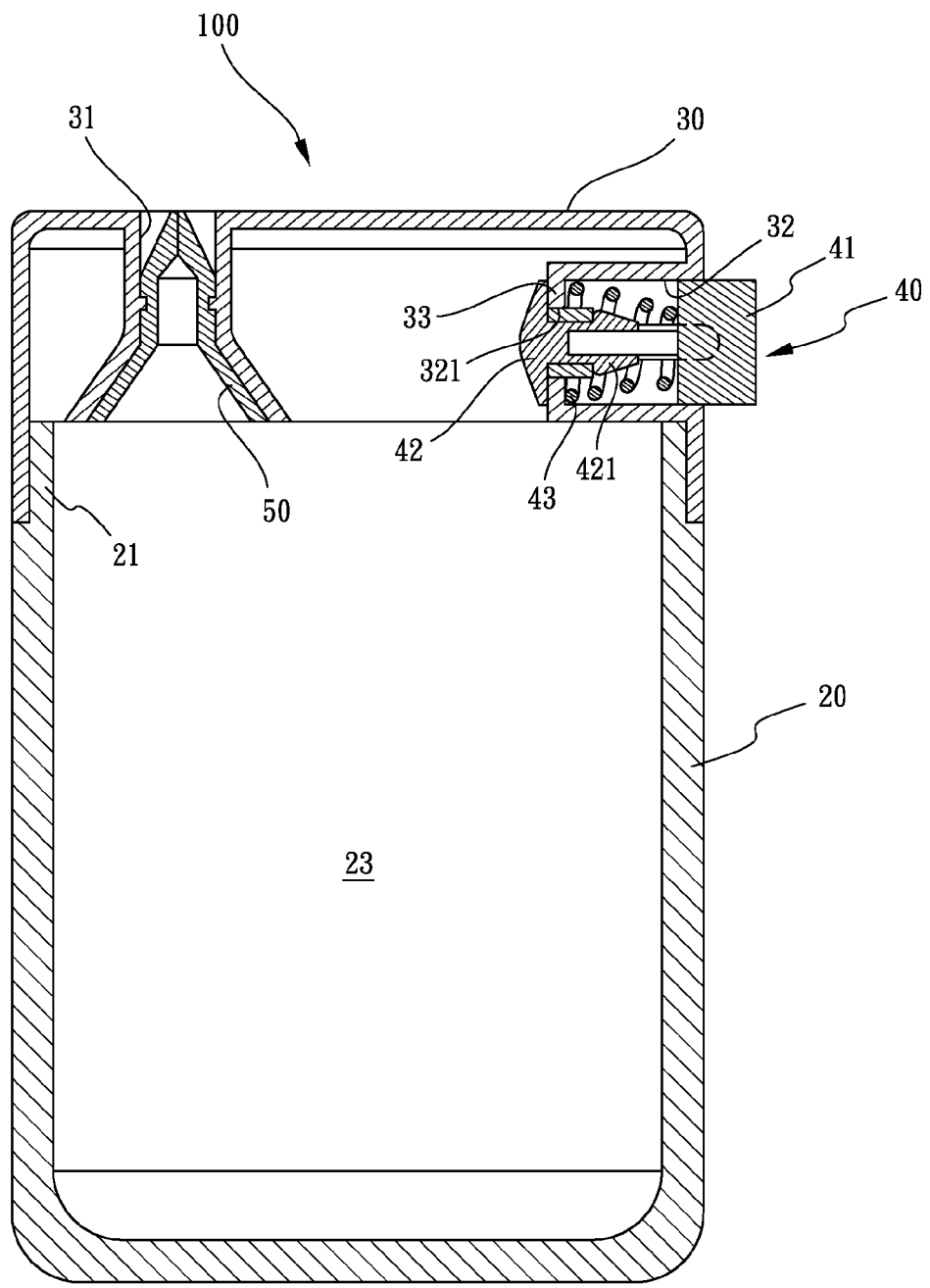
FIG. 3 is a cross-sectional view of the container, taken from the line III-III in FIG. 1, with the first and second valves (40, 50) both in a closed position.

As shown in FIG. 3, the first, seal valve 40 is received in the receptacle 32 of the lid member 30 for normally sealing the first opening 321 in the partition wall 33 of the lid member 30. As will be understood later, the first seal valve 40 is operable to unseal the first opening 321 of the lid member 30. The second, non-return valve 50 is disposed in the second opening 31 of the lid member 30 to permit air to actively flow out of the storage chamber 23 of the container body 20 upon reaching a predetermined degree of pressure, and to prevent environmental air from being drawn into the storage chamber 23.

Specifically, as shown in FIG. 2, the first seal valve 40 includes a button 41 disposed outside the lid member 30, a shutter 42 disposed inside the lid member 30, and a coil spring 43 interposed between the button 41 and an outer face of the partition wall 33 of the lid member 30. The shutter 42 extends through the first opening 321 in the partition wall 33 to engage with the button 41. And the spring 43 is arranged to normally urging the button 41 outwardly and away from the partition wall 33 thereby to hold the shutter 42 in tight sealing contact with an inner face of the partition wall 33 around the first aperture opening 321, as depicted in FIG. 3.

More specifically, the button 41 is integrally formed with a hollow axle 411 and four legs 413 at the same side to fit in the receptacle 32 of the lid member 30. The hollow axle 411 has a pair of retaining holes 412 in opposed side walls thereof. The spring 43 is placed around the hollow axle 411 of the button 41. On the other hand, the shutter 42 is integrally formed at one side with a pair of barb-like feet 421 engaged in the respective retaining holes 412 of the hollow axle 411 of the button 41. In this manner, the shutter 42 is well engaged with the button 41.

Referring to FIG. 1 and in view of FIG. 2, the button 41 of the first seal valve 40 further has at least one notch 44 that communicates the receptacle 32 and the outside environment so as to permit the environmental air to be drawn into the storage chamber 23 when the button 41 of the first seal valve 40 is pushed inward to unseal the first opening 321 of the lid member 30.

Figure 4:
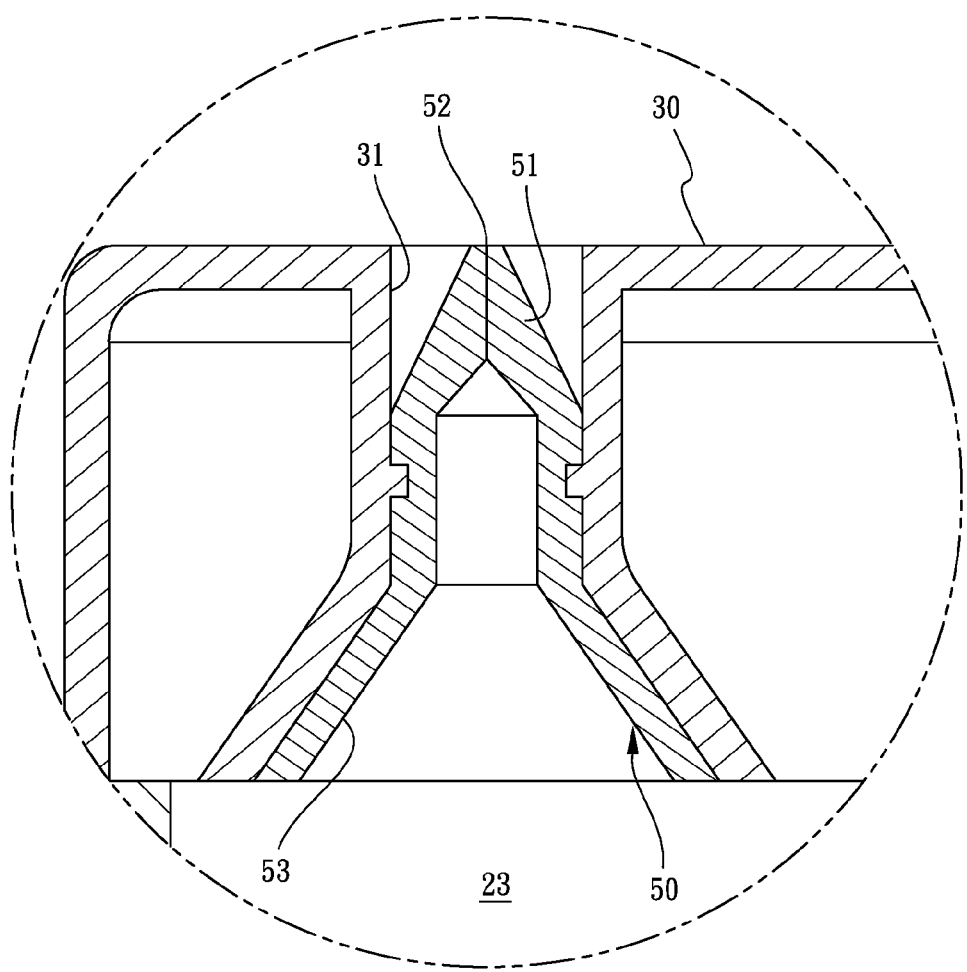
FIG. 4 is a partial enlarged view of the container shown in FIG. 3.

In the illustrated embodiment, the second non-return valve 50 is directed to a duckbill check valve, as best seen in FIG. 2 or 4. Specifically, the second non-return valve 50 is made of resilient or flexible material and has one end having a slit 52 to flex open (see FIGS. 6 and 7) to permit air to pass through and to close (see FIGS. 3 and 4) to prevent backflow.

More specifically, the second non-return valve 50 (namely, the duckbill check valve) includes a duckbill portion 51 at said end having the slit 5 and a flared portion 53 at the other end. As best seen in FIG. 4, the duckbill portion 51 of the second non-return valve 50 is exposed in the second opening 31 of the lid member 30 while the flared portion 53 of the second non-return valve 50 on the other side is directed toward the storage chamber 23 in the container 100 when the lid member 30 is engaged with the container body 20. With the second non-return valve 50, the lid member 30 can be easily attached to the open top end 21 of the container body 20 since excess air in the storage chamber 23 may come out through the slit 52 of the second non-return valve 50, without the environmental air being drawn back into the storage chamber 23.

Figure 5:
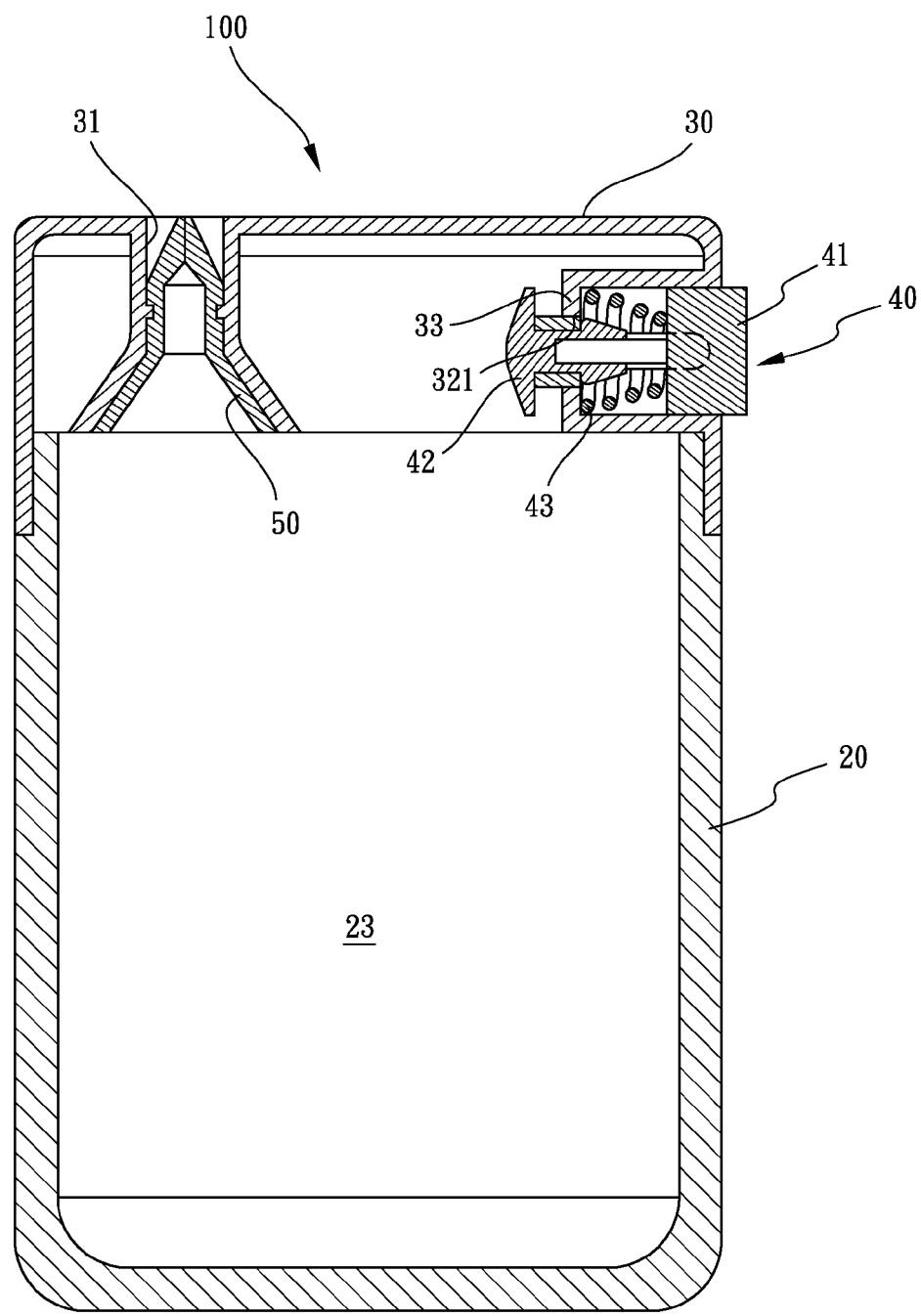
FIG. 5 is a view similar to FIG. 3, except that the first seal valve (40) is in an open position.

To lift or remove the lid member 30 from the container body 20, an user may simply push the button 41 of the first seal valve 40 to have the shutter 42 unseal the first opening 321 in the partition wall 33 of the lid member 30, as shown in FIG. 5. At this time, the environmental air may be drawn back into the storage chamber 23 via the notch 44 of the button 41 (see FIG. 1), the receptacle 32 as well as the first opening 321 of the lid member 30.

Figure 6:
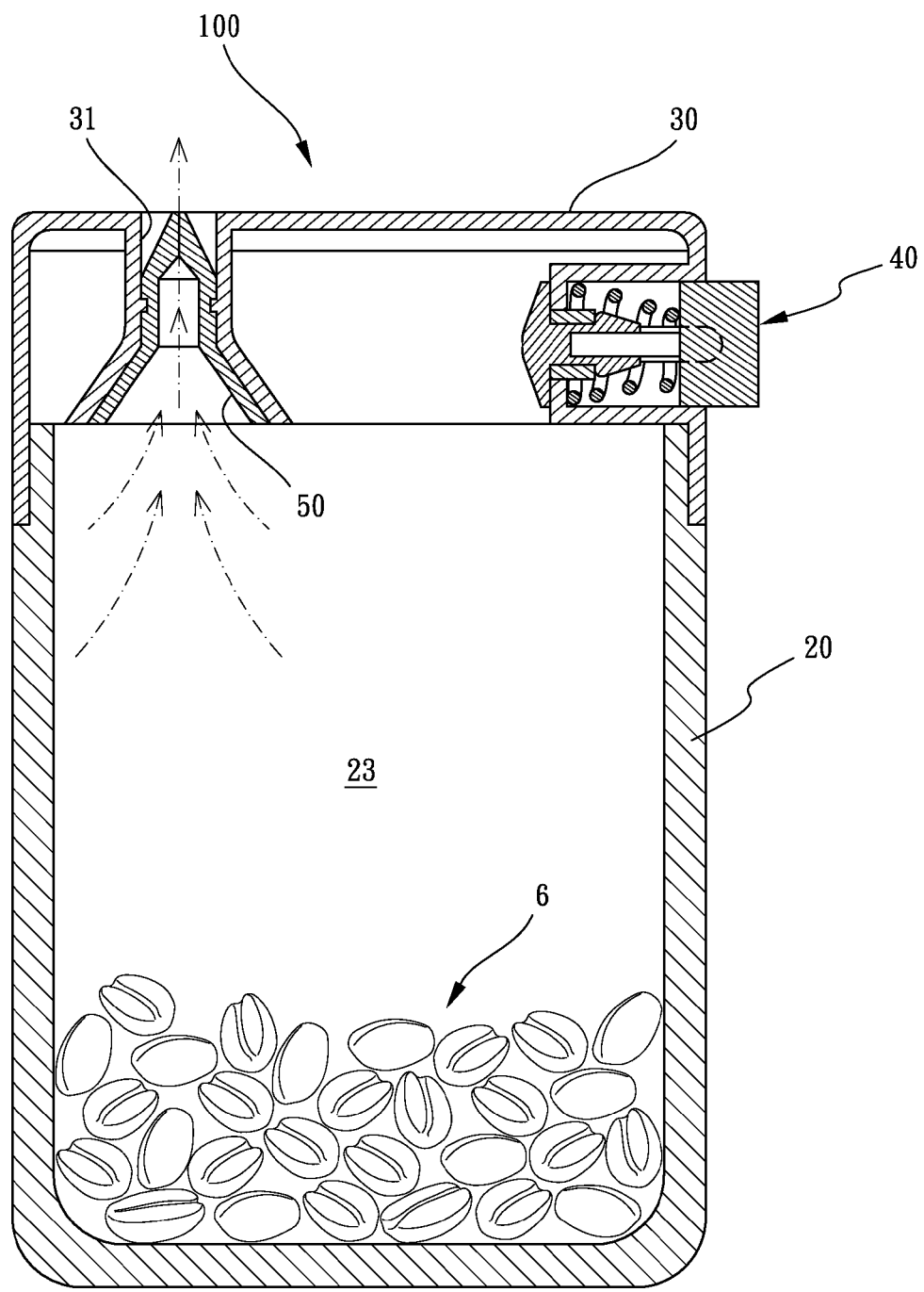
FIG. 6 is a view similar to FIG. 3, except that the second non-return valve (50) is in an open position.
Figure 7:
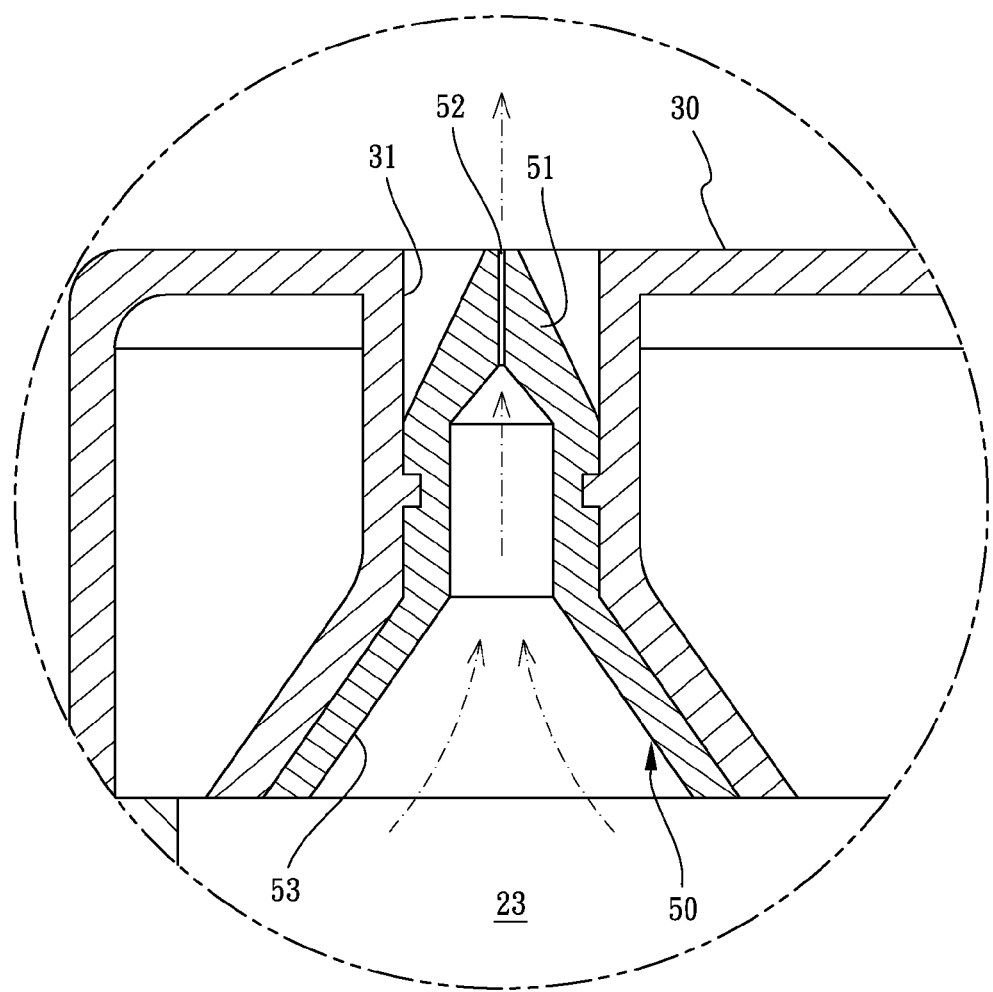
FIG. 7 is a partial enlarged view of the container shown in FIG. 6.

Referring to FIG. 6, the container 100 is suitable for storing coffee beans 6. As is understood, the coffee beans 6 will ferment with time within the container 100, and the gas generated by the coffee beans 6 may automatically moves out of the storage chamber 23 via the slit 52 of the second non-return valve 50 as indicated by the arrows shown in FIG. 7, without the environmental air being drawn back into the storage chamber 23 and keeping the coffee beans 6 from interacting with oxygen and atmospheric moisture and thereby maintaining the beans fresh before use.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A container, comprising:
    a container body;
    a lid member superimposable on the container body to form a storage chamber in the container, the lid member defining therein a first opening and a second opening;
    a first seal valve disposed on the lid member to seal the first opening of the lid member, and being operable to unseal the first opening of the lid member; and
    a second non-return valve disposed in the second opening of the lid member, the second non-return valve being a duckbill check valve and having a duckbill portion formed at one end thereof, the duckbill portion having a slit to flex open to permit air to pass through and to close to prevent backflow, a flared portion formed at the other end of the second non-return valve; the duckbill portion of the second non-return valve being exposed in the second opening of the lid member, when the lid member is engaged with the container body, the flared portion of the second non-return valve is directed toward the storage chamber to permit air to actively flow out of the storage chamber of the container body upon reaching a predetermined degree of pressure, and to prevent environmental air from being drawn into the storage chamber.

2. The container as recited in claim 1, wherein the first seal valve includes a button disposed outside the lid member, a shutter disposed inside the lid member, and a spring interposed between the button and an outer face of a partition wall of the lid member; the shutter extending through the first opening of the lid member to engage with the button; and the spring urging the button outwardly and away from the partition wall thereby to hold the shutter in tight sealing contact with an inner face of the partition wall of the lid member around the first opening.

3. The container as recited in claim 2, wherein the button is integrally formed with a hollow axle which has a pair of retaining holes; the shutter is integrally formed at one side with a pair of barb-like feet engaged in the respective retaining holes of the hollow axle of the button; and the spring is placed around the hollow axle of the button.

4. The container as recited in claim 3, wherein the lid member has a receptacle for reception of the first seal valve; the first opening in the partition wall communicates the storage chamber and the receptacle; and the button of the first seal valve has a notch that communicates the receptacle and outside environment so as to permit the environmental air to be drawn into the storage chamber when the button of the first seal valve is pushed inward to unseal the first opening of the lid member.

5. The container as recited in claim 1, wherein the second non-return valve is made of resilient or flexible material.

* * * * *